United States Patent [19]

Thebert

[11] Patent Number: 4,615,422
[45] Date of Patent: Oct. 7, 1986

[54] COUPLING WITH SPLINE CLUTCH HAVING DIFFERENT HELIX ANGLES

[75] Inventor: Glenn W. Thebert, Carmel, Ind.

[73] Assignee: General Motors Corporation, Detroit, Mich.

[21] Appl. No.: 690,994

[22] Filed: Jan. 14, 1985

[51] Int. Cl.$^4$ ............................................. F16D 11/04
[52] U.S. Cl. .................................... 192/53 B; 74/458; 192/67 R; 192/108
[58] Field of Search .................. 192/53 R, 53 B, 53 E, 192/53 F, 108, 67 R; 74/458

[56] References Cited

U.S. PATENT DOCUMENTS

| | | | |
|---|---|---|---|
| 3,137,376 | 6/1964 | Schick | 192/108 X |
| 3,580,371 | 5/1971 | Kron et al. | 192/53 B X |
| 4,157,135 | 6/1979 | Devlin et al. | 192/53 B |

FOREIGN PATENT DOCUMENTS

| | | | |
|---|---|---|---|
| 972764 | 9/1959 | Fed. Rep. of Germany | 192/53 F |
| 2008206 | 5/1979 | United Kingdom | 192/53 B |

*Primary Examiner*—Kenneth J. Dorner
*Assistant Examiner*—Dwight G. Diehl
*Attorney, Agent, or Firm*—Saul Schwartz

[57] ABSTRACT

A coupling between a continuously rotating input shaft and a selectively rotatable output shaft has a friction type transition clutch operative to accelerate the output shaft to synchronous speed and to permit controlled deceleration of the output shaft to rest and a spline type direct clutch parallel to the transition clutch engageable at synchronous speed to directly couple the input and output shafts. The spline clutch includes an input member having an input spline with a pressure face at a first helix angle, an output member having an output spline with a pressure face at a second, smaller helix angle, and a longitudinally shiftable intermediate member having a spline with a first pressure face at the first helix angle and a second pressure face at the second helix angle. The difference in helix angles effects circumferential separation between the output spline pressure face and the intermediate member spline second pressure face before the two splines separate longitudinally.

3 Claims, 9 Drawing Figures

COUPLING WITH SPLINE CLUTCH HAVING DIFFERENT HELIX ANGLES

The invention herein described was made in the course of work under a contract or subcontract thereunder with the National Aeronautics and Space Administration.

BACKGROUND OF THE INVENTION

1. Field of the Invention

This invention relates generally to shaft couplings having parallel transition and direct clutches and, more particularly, to an improvement in spline type direct clutches for such couplings.

2. Description of the Prior Art

In a lift/cruise aircraft, a gas turbine engine prime mover on the aircraft develops shaft horsepower to rotate a rotor during vertical lift and shaft horsepower or thrust to propel the aircraft during horizontal cruise. When the rotor is rotating, it is desirable to effect a direct connection, as by splines, between the engine and the rotor. During cruise, when the rotor is stationary, the latter must be completely disconnected from the engine. During transitions between lift and cruise, relative rotation between the rotor and the engine takes place as the rotor transitions between rest and a synchronous speed relative to a power supply shaft from the engine. One coupling proposed for such applications and disclosed in U. S. Pat. No. 4,157,135, issued June 5, 1979 to Devlin and Janneck and assigned to the assignee of this invention, includes a hydraulically actuated friction type transition clutch and a hydraulically actuated direct clutch wherein a spline connection may be established and severed when the rotor is at a synchronous speed relative to a power supply shaft from the engine. A coupling according to this invention includes a spline type direct clutch having an improved withdrawal characteristic relative to heretofore known spline clutches.

SUMMARY OF THE INVENTION

Accordingly, the primary feature of this invention is that it provides a new and improved coupling for disposition between a gas turbine engine prime mover and a lift rotor in an aircraft having lift and cruise operating modes. Another feature of this invention resides in the provision in the new and improved coupling of a spline type direct clutch arranged in parallel with a friction type transition clutch, the spline clutch having a withdrawal characteristic whereby the engaging pressure faces of the splines separate circumferentially before the splines separate longitudinally. Still another feature of this invention resides in the provision in the new and improved coupling of a spline type direct clutch including an input helical spline on an input member connected to the prime mover having a first helix angle, an output helical spline on an output member connected to the rotor having a second helix angle different from the first helix angle, and a longitudinally slidable intermediate member rotatable with the input member having a first helical spline with the first helix angle continuously drive connected to the input spline and a second helical spline with the second helix angle selectively drive engageable with the output splines to establish a direct connection between the input and output members, the difference in the helix angles causing the pressure faces of the second splines on the intermediate member to separate from the pressure faces of the splines on the output member before longitudinal separation therebetween occurs. A further feature of this invention resides in the provision in the new and improved coupling of input and output helical splines wherein the helix angle of the input spline is greater than the helix angle of the output spline. A still further feature of this invention resides in the provision in the new and improved coupling of input and output splines in the form of external splines on the input and output members and first and second splines in the form of internal splines on the intermediate member.

These and other features of this invention will be readily apparent from the following specification and from the drawings wherein.

Figure 2:
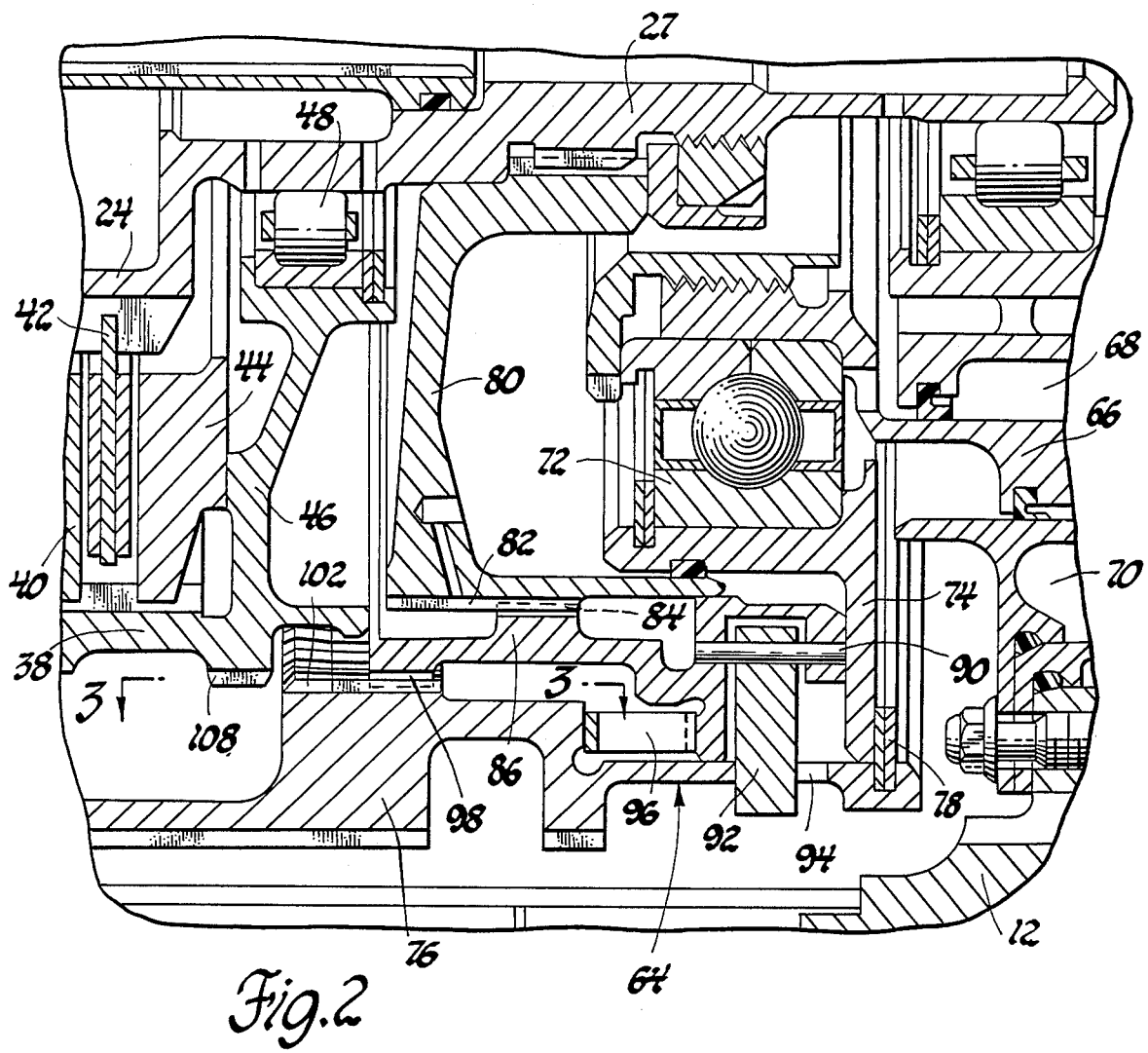
FIG. 2 is an enlarged view of a portion of FIG. 1 indicated by arrowed circle 2, showing, in particular, a portion of the direct clutch of the coupling in an condition.
Figure 3:
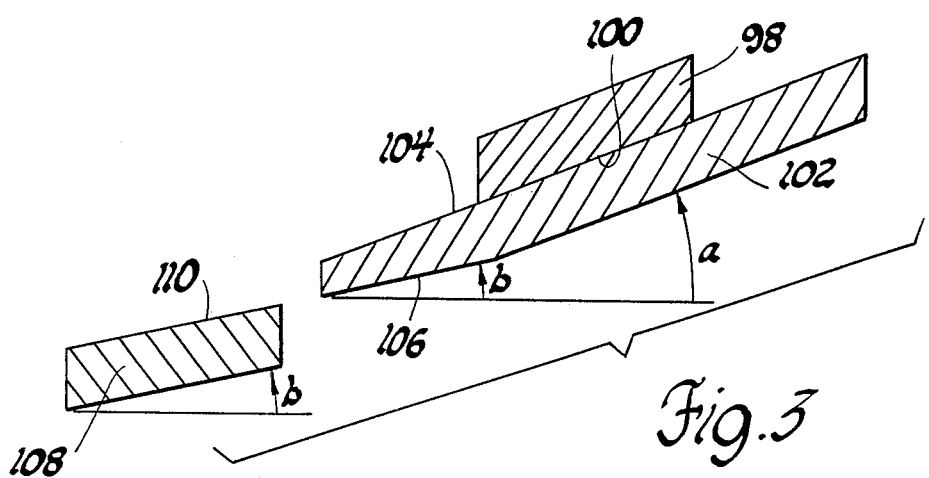
Figure 4A:
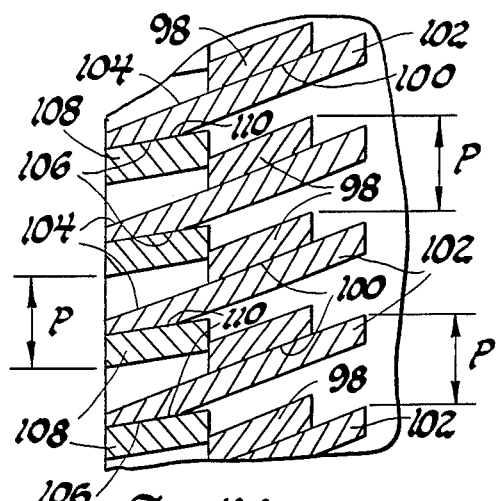
Figure 4B:
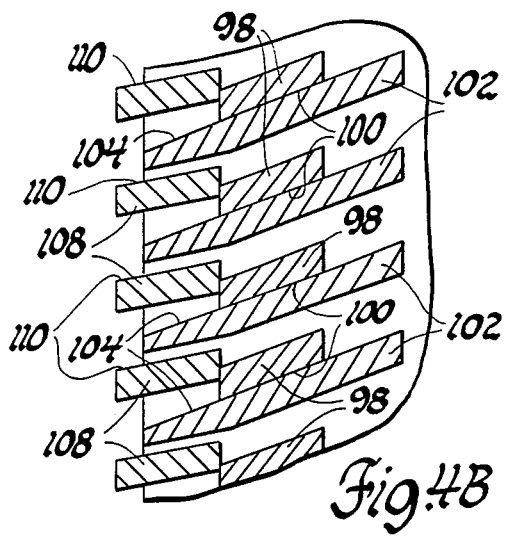
Figure 4C:
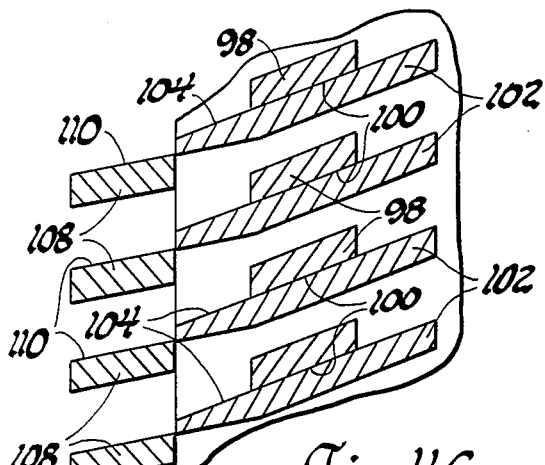
Figure 4D:
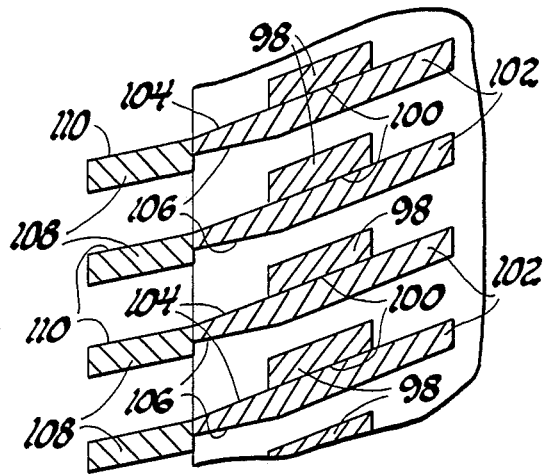
Figure 4E:
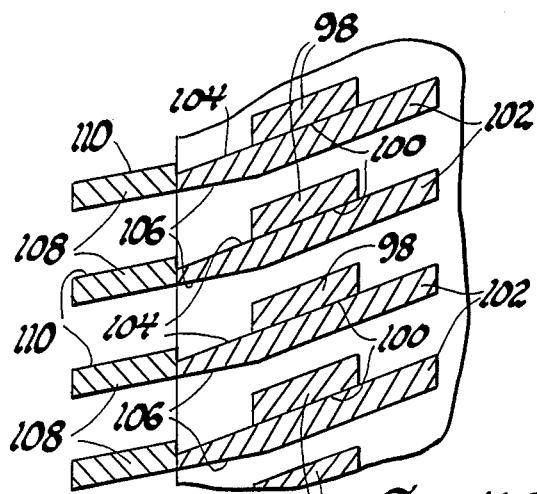
Figure 4F:
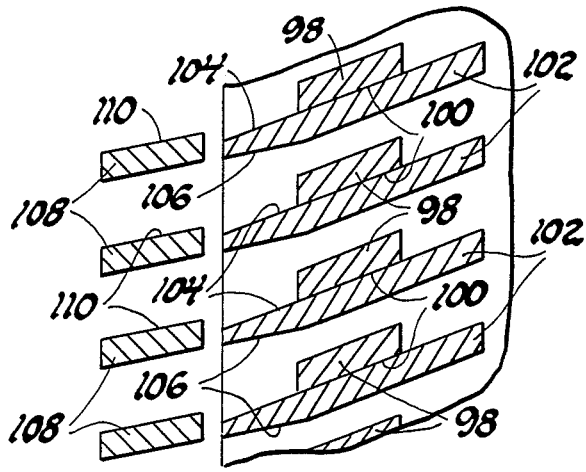

FIG. 3 is an enlarged schematic view taken generally along the plane indicated by lines 3—3 of FIG. 2 and showing one spline from each of the input, output, and intermediate members; and FIGS. 4A–4F is similar to FIG. 3 but showing a plurality of splines from each of the input, output, and intermediate members of the direct clutch and depicting progression from a fully engaged condition to a fully disengaged condition.

Figure 1:
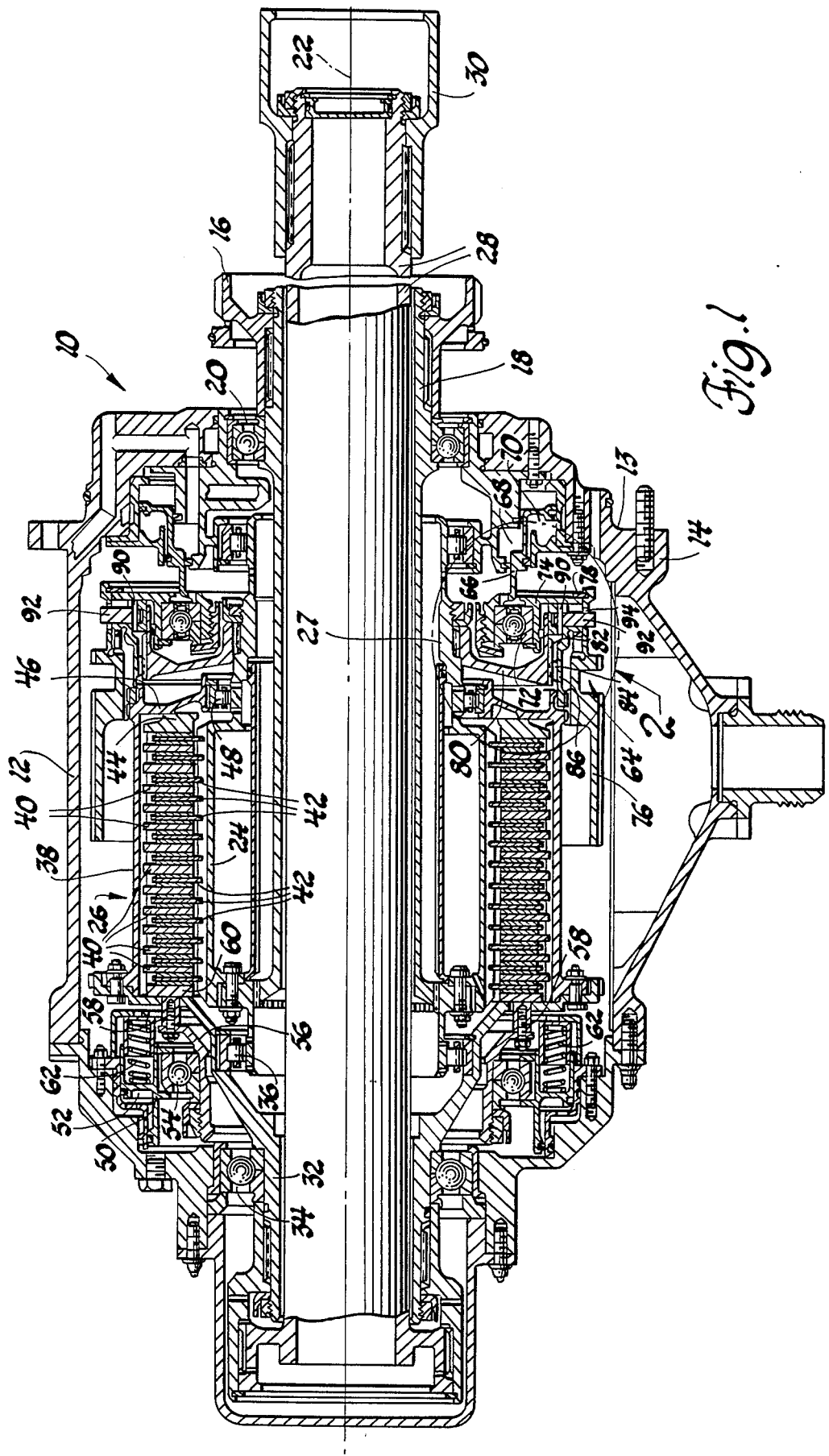
FIG. 1 is a longitudinal sectional view of a coupling according to this invention with a direct clutch thereof engaged.

Referring now to FIGS. 1 and 2 of the drawings, a coupling 10 according to this invention has a generally cylindrical housing 12 adapted for rigid attachment to a support structure, not shown, at a mounting surface 13 on a flange 14. The coupling 10, except as otherwise represented hereinafter, is as described in the aforementioned U.S. Patent to Devlin & Janneck and reference may be made to that patent for a full and detailed description of the common structure. Generally, the coupling 10 includes an input gear 16 drive connected to an input shaft 18 one end of which is supported on the housing 12 by a bearing 20 for rotation about an axis 22. The other end of the input shaft 18 is rigidly connected to a hub 24 of a friction type transition clutch 26, the hub 24 having a cylindrical extension 27 projecting back toward the bearing 20. The coupling 10 further includes a cylindrical output shaft 28 aligned on the axis 22 within the input shaft 18 with a drive yoke 30 at one end thereof outboard of input gear 16 and with the other end drive connected to a flange assembly 32 surrounding the output shaft and projecting back toward the drive yoke 30. A bearing 34 between the housing 12 and the flange assembly 32 supports the inboard end of the output shaft on the housing for rotation about the axis 22. A roller bearing 36 is disposed between an inwardly facing race on the flange assembly 32 and a flange of the hub 24 whereby the inboard end of the input shaft and hub are supported for rotation about the axis 22. In the aforementioned U.S. Patent to Devlin and Janneck, the input and output shafts, functionally identical to input and output shafts 18 and 28, are coaxial. In coupling 10, the input shaft 18 is drive connected to the gas turbine engine power output shaft and the output shaft 28 is drive connected to the lift rotor.

The transition clutch 26 further includes a cylindrical drum 38 rigidly attached to the flange assembly 32 for rotation as a unit therewith and with the output shaft 28.

A plurality of axial internal splines on the drum 38 support a plurality of outer clutch plates 40 for rotation as a unit with the drum and for longitudinal movement along the axis 22. Between each of the outer clutch plates 40 is disposed one of a plurality of inner clutch plates 42 spline connected to the hub 24 for rotation as a unit with the hub and for longitudinal sliding movement along the axis 22. A backing plate 44 rotatable as a unit with the drum 38 is disposed at the end of the stack of plates and abuts an inturned end 46 of the drum 38. A roller bearing 48 is disposed between the radially innermost edge of the inturned end 46 and an appropriate race surface on the hub extension 27 whereby the end of the drum 38 opposite flange assembly 32 is supported for rotation about the axis 22.

When no pressure is applied to the stack of plates 40 and 42, the input shaft 18 is freely rotatable relative to the output shaft 28, lubrication oil spray between the plates maintaining adequate clearance with minimum drag. An annular piston 50, slidably supported on the housing 12 and energized by pressurized hydraulic fluid in an annular chamber 52, has supported thereon a bearing 54 which, in turn, supports an annular carriage 56 having attached thereto a plurality of axially oriented pressure applicators 58. Each of the pressure applicators projects through an appropriate aperture in the flange assembly 32 and engages an outer plate 60 at the end of the stack of plates opposite the backing plate 44. The bearing 54 supports the carriage 56 and the applicators 58 on the housing 12 for rotation as a unit with the output shaft 28 and for longitudinal movement along the axis 22 as a unit with the annular piston 50.

The transition clutch 26 is energized when pressurized hydraulic fluid is admitted to chamber 52 causing the piston 50 and the bearing 54 to urge the carriage 56 and the pressure applicators 58 against the end plate 60 whereby the entire stack of plates is compressed. As the pressure in chamber 52 increases from zero to a maximum modulated pressure, the pressure applicators 58 progressively clamp the plates together causing the output shaft 28 to accelerate from rest to a synchronous speed equal to the speed of input shaft 18. Conversely, when the pressure in chamber 52 is exhausted, a plurality of return springs 62 between the housing 12 and the piston 50 retract the piston, the bearing 54, the carriage 56 and the pressure applicators 58 so that the input shaft 18 is once again freely rotatable relative to the output shaft 28 which may then be brought to rest.

With continued reference to FIGS. 1 and 2, the coupling 10 further includes a spline type direct clutch 64 between the hub extension 27 and the drum 38. The direct clutch 64 includes a stepped annular piston 66 supported on the housing 12 for longitudinal movement along the axis 22. The piston 66 is energized to the left when pressurized fluid is introduced into an annular engage chamber 68 behind the piston and is energized to the right when pressurized hydraulic fluid is introduced into an annular disengage chamber 70 on the opposite side of the piston from the engage chamber 68. A bearing 72 carried on the inboard end of the stepped piston 66 supports an annular bracket element 74 for rotation relative to the piston. The annular bracket element 74 is surrounded by a generally cylindrical intermediate lock member 76 having supported thereon an annular retaining ring 78, the retaining ring limiting rightward movement of the bracket element 74 relative to the intermediate lock member.

An inner lock member 80, drive connected to the hub extension 27, has an outer cylindrical portion on which are defined a plurality of external, axial splines 82. The axial splines 82 are slidably engaged by a corresponding plurality of internal axial splines 84 on a generally cylindrical aft lock member 86. The aft lock member 86 has a plurality of pins 90 which support, in appropriate grooves, a corresponding plurality of centrifugal weights 92 which engage the sides of a corresponding plurality of apertures 94 in the intermediate lock member 76 immediately radially outboard of the weights. An annular wave spring 96 disposed between facing annular shoulders on the intermediate lock member 76 and on the aft lock member 86 urges relative separation between the intermediate and aft lock members. The inner lock member 80, the aft lock member 86 and the intermediate lock member 76 are all rotatable as a unit with the input shaft 18. The inner lock member 80 and the aft lock member 86 are drive connected by splines 82 and 84 and rotate as a unit with the input shaft 18. The intermediate lock member 76, drive connected with the aft lock member 86 as more fully described hereinafter, is rotatable with the aft lock member and, to a limited extent, relative thereto. The weights 92, when the input shaft rotates, bias the intermediate lock member 76 to a predetermined angular position relative to the aft lock member.

Referring to FIGS. 2, 3 and 4A-4F and describing the departure of the coupling 10 from the coupling disclosed in the aforementioned U.S. Patent to Devlin and Janneck, the aft lock member 86, at one end thereof, includes a plurality of external input helical splines 98 having pitch P. Each of the splines 98 has a pressure face 100 oriented at a helix angle a relative to axis 22. The intermediate lock member 76, on an internal cylindrical surface thereof, includes a plurality of internal helical splines 102 having pitch P. Each of the splines 102 has a first pressure face 104 oriented at helix angle a and a second pressure face 106 on the opposite side of the spline oriented at a second helix angle b relative to the axis 22 less than helix angle a. The drum 38, at the inturned end 46 thereof, includes a plurality of external output helical splines 108 having pitch P. Each spline 108 has a pressure face 110 oriented at helix angle b.

Operationally, the coupling 10 can be described as having an inactive mode corresponding to engine off or ground idle conditions or to steady state aircraft flight in the cruise mode, a transition active mode corresponding to aircraft flight during transition between the lift and cruise modes, and a lift active mode corresponding to steady state aircraft flight in the lift mode. In the inactive mode, the transition clutch 26 is disengaged or deenergized and the stepped piston 66 of the direct clutch 64 is maintained in a retracted position, FIG. 2, corresponding to a disengaged condition of the direct clutch by pressure in disengage chamber 70. Thus, in the inactive mode of the coupling, the input shaft 18 is fully rotatable relative to the output shaft 28.

Assuming the aircraft is on the ground with the engine idling and the rotor stationary, the coupling is actuated to a first phase of the transition active mode by energization of transition clutch 26. The transition clutch, through relative slip between the plates 40 and 42, accelerates the output shaft 28 and drive connected rotor from rest to a synchronous speed equal to the speed of input shaft 18. At synchronous speed, drum 38 and hub extension 27 rotate at the same speed with no relative rotation existing between the intermediate lock member 76 and the drum 38. The coupling is then actuated to a second phase of the transition active mode through pressurization of engage chamber 68 while disengage chamber 70 is exhausted. Pressure in chamber 68 projects or strokes stepped piston 66 to the left, FIG. 1, causing the annular bracket member 74 to shift the aft lock member 86 to the left. Concurrently, through wave spring 96, the intermediate lock member 76 is projected toward the drum 38 while the weights 92 maintain the first pressure faces 104 on the external helical splines 102 against the pressure faces 100 on the external splines 98 on the aft lock member 86.

On a random basis, the internal helical splines 102 may be angularly indexed relative to the external helical splines 108 on the drum 38, in which event movement of the intermediate lock member 76 to an engaged position, FIG. 1, wherein each of the external splines 108 is fully longitudinally overlapped by a corresponding one of the internal splines 102 with second pressure face 106 against pressure face 110, is unobstructed. Also on a random basis, the internal splines 102 on the intermediate lock member 76 might interfere with the external splines 108 on the drum, FIG. 4E. In that event, continued leftward travel of the aft lock member 86 relative to the intermediate lock member, permitted by wave spring 96, is accompanied by relative rotation therebetween due to the helix angle a of the external splines 98 and of the first pressure face 104 of the internal splines 102, FIGS. 4D, 4C and 4B. When the splines 102 and 108 are adequately angularly indexed, wave spring 98 projects the intermediate lock member to the engaged position, FIGS. 1 and 4A. With the splines 102 fully overlapping the splines 108, a direct power path between the input shaft 18 and the output shaft 28 parallel to transition clutch 26 is established. The coupling 10 is then actuated from the transition active mode to the lift active mode by deenergization of the transition clutch so that the sole power path between the engine and the rotor is through the direct clutch.

With the aircraft in flight and prepared for cruise, the coupling 10 is actuated from the lift active mode to the second phase of the transition active mode by introduction of pressure fluid to chamber 52 of the transition clutch 26 whereby the pressure applicators 58 clamp the plates 40 and 42 against the inturned end 46. Because the spline connections between the plates 40 and 42 and the hub 24 and drum 38, respectively, are relatively loose to permit free longitudinal movement of the plates, random vibration during the lift active mode when the plates are unclamped could produce plate orientations wherein less than all of the plates are in driving engagement with corresponding ones of the hub 24 and drum 38. In that event, the transition clutch 26 does not assume an active, power transferring role until complete disengagement occurs between pressure faces 106 on internal splines 102 and pressure faces 110 on external splines 108.

Referring particularly to FIGS. 4A-4F, after the transition clutch 26 is energized, the coupling is actuated to the first phase of the transition active mode by introduction of pressure fluid to disengage chamber 70 while engage chamber 68 is exhausted. Piston 66 is thus stroked or shifted to the right, FIG. 1, causing annular bracket member 74 to engage retaining ring 78 and likewise initiate rightward movement of intermediate lock member 76 from the engaged position, FIG. 4A.

Because the rotor is still rotating, substantial power continues to flow through the direct clutch so that external splines 98 on the aft lock member 86 are continually urged leftward due to helix angle a, i.e. the external splines 98 tend to thread themselves into internal splines 102 on the intermediate lock member 76. Accordingly, as the intermediate lock member is withdrawn to the right, it moves longitudinally relative to the aft lock member and, therefore, also rotates relative to the latter. This causes pressure faces 106 on the internal splines 102 to separate circumferentially from pressure faces 110 on the external splines 108 as the two sets of splines simultaneously separate longitudinally, FIG. 4B, due to the difference between helix angles a and b. The result is that whatever load is carried across the overlapped splines 102 and 108 after the transition clutch is engaged is transferred completely to the latter while substantial overlap between the splines still exists. For example, where the helix angle b is on the order of only about 1° to 2° less than helix angle a, and angle a is about 14°, circumferential separation between the pressure faces 106 and 110 occurs while about 90% of the maximum overlap between splines 102 and 108 still exists. As soon as the power path through the direct clutch 64 is severed, the aft lock member 86 retracts to the right as a unit with the intermediate lock member 76 through the positions illustrated in FIGS. 4C through 4D. The coupling 10 is then actuated back to the inactive mode by gradual deenergization of transition clutch 26, during which rotation of the rotor is halted by an external brake, not shown. In the inactive mode with the aircraft in cruise flight, transition back to the lift flight mode entails another operational cycle of the coupling as described hereinbefore.

The embodiments of the invention in which an exclusive property or privilege is claimed are defined as follows:

1. In a coupling between an input shaft continuously rotatable about an axis of said coupling and an output shaft selectively rotatable about said axis, said coupling including a transition clutch selectively operable to accelerate said output shaft from rest to a synchronous speed corresponding to the speed of said input shaft and to permit controlled deceleration of said output shaft from said synchronous speed to rest, a direct clutch comprising, an input member drive connected to said input shaft and continuously rotatable therewith about said axis, an output member drive connected with said output shaft and rotatable therewith about said axis, an input helical spline on said input member having a pressure face at a first helix angle relative to said axis, an output helical spline on said output member having a pressure face at a second helix angle relative to said axis different from said first helix angle, an intermediate member, and helical spline means on said intermediate member having a first pressure face oriented at said first helix angle and a second pressure face oriented at said second helix angle, said intermediate member being disposed on said input member with said first pressure face drive engaged on said input spline pressure face so that said intermediate member is rotatable with said input member and longitudinally shiftable relative thereto along said axis at said synchronous speed between an extended position wherein said second pressure face overlaps and is drive engaged on said output spline pressure face and a retracted position wherein said second pressure face is longitudinally separated from said output spline pressure face, the difference between said first and said second helix angles effecting circumferential separation between said second pressure face and said output spline pressure face before longitudinal separation therebetween.

2. The coupling recited in claim 1 wherein said first helix angle is greater than said second helix angle.

3. The coupling recited in claim 2 wherein each of said input and said output helical splines are external splines and said intermediate member spline means is an internal spline having said first pressure face on a first side thereof and said second pressure face on a second side thereof.

* * * * *